Patented June 14, 1932

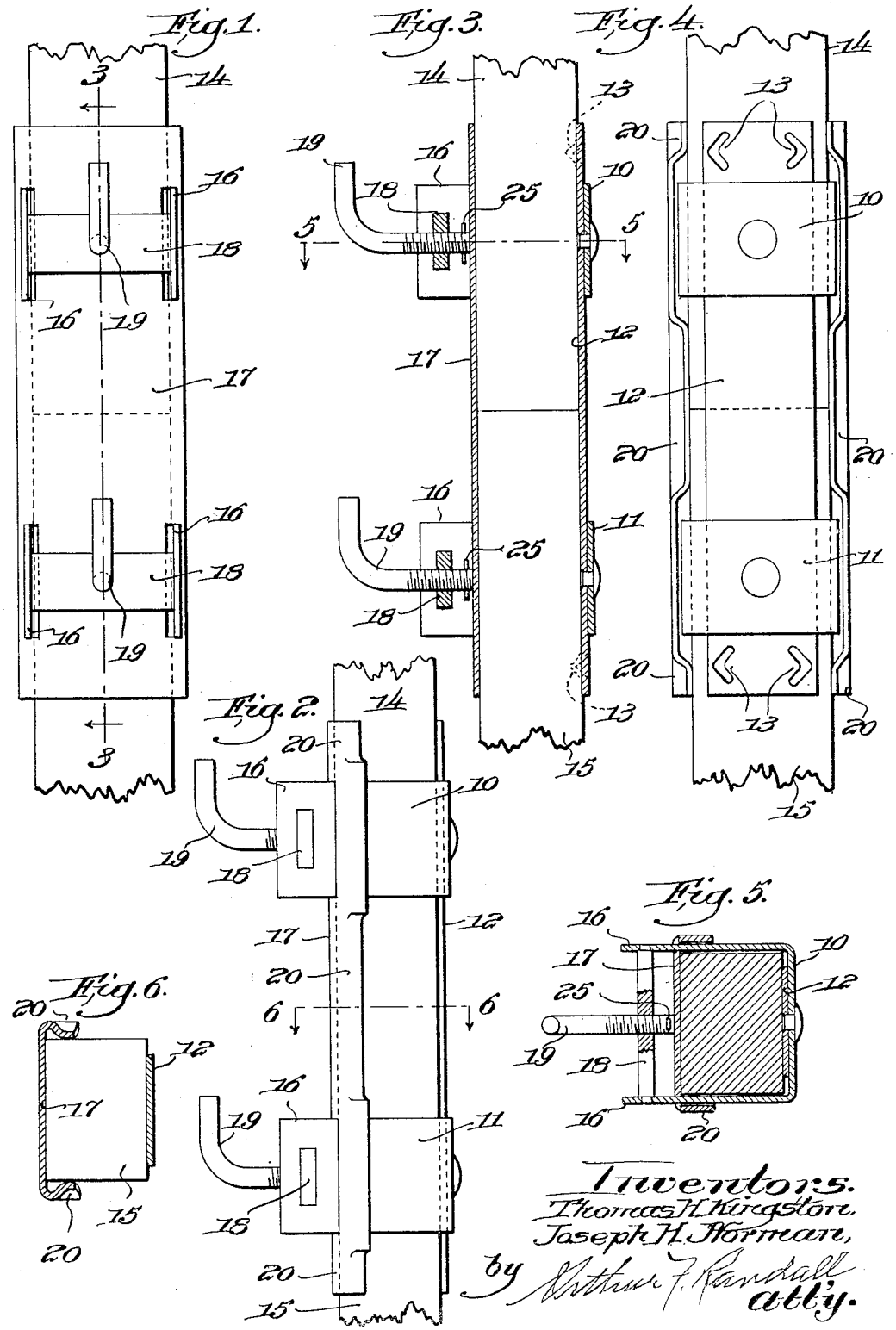

1,863,247

UNITED STATES PATENT OFFICE

THOMAS H. KINGSTON AND JOSEPH H. NORMAN, OF WEST SOMERVILLE, MASSACHUSETTS, ASSIGNORS TO FRANK G. KINGSTON, A. ROY KINGSTON, CHARLES C. PIMM, AND MABEL G. KITCHEN, A PARTNERSHIP DOING BUSINESS AS BUILDERS' PATENT SCAFFOLDING COMPANY

POLE SPLICE CLAMP

Application filed February 9, 1927. Serial No. 166,908.

This invention relates to means to splice poles and more particularly to a pole splice clamp adaptable for use in erecting scaffolding for the construction of buildings.

It is an object of the invention to produce a safe, sturdy pole splice clamp of simple structure that may be easily manipulated for the erection or dismantling of scaffolding.

It is a further object of the invention to provide the trade with a pole splice clamp which may be used repeatedly with the same poles if desired to thereby obviate the necessity of using new lumber on each job.

Another object of the invention is to provide a pole splice clamp which is capable of firmly splicing poles together without injury thereto so that the poles once used for scaffolding are not injured by nail holes but may be used for other purposes when the scaffolding is dismantled if so desired.

Other objects of the invention will be readily understood from a description of the drawing and the claims hereinafter given.

Of the drawing:

Figure 1 represents a front elevation of a pole splice clamp embodying the invention.

Figure 2 is a side elevation of the device shown in Figure 1.

Figure 3 is a section on the line 3—3 Figure 1.

Figure 4 is a rear elevation of the device shown in Figure 1.

Figure 5 is a section on the line 5—5 Figure 3.

Figure 6 is a section on the line 6—6 Figure 2.

Like characters represent like parts throughout the several figures of the drawing.

Referring to the drawing:

The drawing herewith illustrates a simple form of pole splice clamp wherein two pole embracing members 10 and 11 are firmly secured together by a back member 12 which extends beyond said members 10 and 11, and is in this instance provided with spurs 13 to engage the poles 14 and 15.

Slidably mounted on the side portions 16 of the members 10 and 11 is a front plate or follower member 17 which serves as a clamp member to firmly clamp the poles between it and the back member 12, the said side portions 16 have bars 18 permanently arranged thereon which furnish bearings for the hand screws 19 by which means the front plate 17 is forced against the poles, and the follower member is prevented from being removed from the clamp proper.

The plate 17 is provided with side portions or wings 20 arranged to strengthen the clamp as a whole, and to form bearing members to engage the sides of the poles to prevent lateral movement thereof.

In adjusting the clamp for use, the hand screws 19 will be turned to allow the follower or clamp plate 17 to be moved outwardly sufficiently to permit the clamp to be placed on a pole, as 15 for instance, and thereafter another pole will be placed end to end with it, and the clamp will be moved longitudinally of the poles until the abutting ends thereof will be approximately midway of the clamp whereupon both the hand screws will be tightly set up to firmly clamp the abutting poles in position and against lateral movement in any direction.

It is an object of the invention to produce a simple pole splice clamp which may be shipped from place to place and which may be used by unskilled workmen or laborers and therefore so constructed as to be a unit with no detachable parts to become lost during transit or through carelessness.

It will be observed that the follower or clamp plate 17 is of such construction and so assembled with the other portions of the clamp that it is not detachable therefrom, and to prevent the hand screws from accidental separation they are provided with cotter pins 25 which limit the outward movement thereof so that the clamp might be considered as a unitary fitting capable of having some of its parts adjusted to suit the occasion of use, and avoiding the liability of loss thereof.

The wing portions 20 of the plate 17 not only bear against the poles 14 and 15 to prevent lateral movement or swaying thereof but they strengthen the said plate against bending fore and aft and thus aid in relieving such strain from the back plate 11.

It is not known that a pole splice clamp has ever been used wherein the poles were spliced end to end by a unitary clamp capable of adjustment longitudinally of the poles and wherein the use of nails as fastening means was obviated.

In view of the above it is not the intention to limit the invention to the precise construction and arrangement shown as changes might be made therein without departing from its spirit and scope.

Having described the invention we claim:

1. A pole splice clamp of the class described comprising a pair of pole embracing members, a back member having pole-engaging spurs and securing said members in spaced relation, and arranged to receive the ends of two abutting poles, each of said embracing members being arranged to embrace one of the poles; a clamp plate slidably mounted on said embracing members and having wing portions arranged to contact with each side of said poles whereby lateral movement thereof is prevented; and means to force said clamp plate towards said poles.

2. A pole splice clamp of the class described comprising a pole contact member having pole-engaging spurs and pole embracing means rigidly secured thereto intermediate its ends; a clamp plate permanently attached to said pole embracing means but slidable thereon towards and from said contact member, said pole embracing means, contact member and plate being arranged to receive the ends of poles between them; said plate having wing portions arranged to contact with and adjacent the ends of abutting poles located in said clamp; and means to cause said clamp plate to move towards said contact member.

3. A pole splice clamp comprising pole embracing members situated to engage poles above and below the abutting ends of poles, a vertical clamp plate contacting with the pole sides above and below said abutting ends, said plate having at opposite edges inturned wings that contact with the adjacent side surfaces of the poles, a back member having pole-engaging spurs, and means to force said plate against the poles.

4. A pole splice comprising in a permanently assembled unit oppositely acting members adapted to engage opposite sides of pole sections placed between them and separate actuating devices spaced apart vertically to cause relative movement of said members towards one another, said actuating devices being permanently associated with said members and a portion of the latter extending between and joining said devices.

5. A pole splice comprising opposite pole engaging shoes movable towards and from one another and a plurality of vertically spaced apart clamps having cooperating members acting on the respective shoes, said clamps being permanently associated with said members and a portion of the latter extending between and joining said clamps.

Signed by me at Clearwater, Florida, this 3rd day of December, 1926.

THOMAS H. KINGSTON.

Signed by me at West Somerville, Massachusetts, this 29th day of November, 1926.

JOSEPH H. NORMAN.